Patented Feb. 17, 1942

2,273,431

UNITED STATES PATENT OFFICE 2,273,431

TITANIUM PIGMENT PRODUCTION

James Eliot Booge, Wilmington, Del., assignor to E. I. du Pont de Nemours & Company, Wilmington, Del., a corporation of Delaware No Drawing. Application June 22, 1938, Serial No. 215,218

13 Claims. (Cl. 23—202)

This invention relates to improved titanium pigments and to novel methods for producing the same. More particularly, it concerns the production of improved white titanium dioxide pigments in substantially rutile crystalline state, and characterized by exceptionally high durability and resistance toward chalking and fading.

Titanium dioxide occurs in three modifications or crystalline forms, i. e., anatase, brookite and rutile, the refractive indices of which, respectively, are 2.52, 2.64 and 2.61. Commercial titanium dioxide pigments are characterized by the anatase crystalline structure which, as indicated, has the lowest refractive index. They are relatively porous in structure, extremely irregular of surface, very fine in particle size, and chalk and fade badly when employed in coating compositions exposed to exterior or atmospheric influences. When formulated in high covering power linseed oil paints and exposed to the elements, the paint film disintegrates within a very short time, such breaking down being manifested by the appearance of numerous particles of loosely-held pigment on the surface of the film. This phenomena the art denominates "chalking." If the white pigment has been tinted to a color by means of a colored pigment, or to gray by means of lamp black, the chalk particles of white pigment on the surface of the tinted paint film obscure the color of the underlying surface, and the paint then presents a blotchy, unsightly appearance, some areas of which are "faded" or have lost their original color to become "whiter." Accordingly, the use of titanium dioxide pigments is seriously limited in paints and coating compositions, and especially in those designed to cover surfaces for either protection or ornamentation requiring subjection to outdoor exposures.

The ideal, commercial titanium dioxide pigment adaptable for use in both interior and exterior coating applications must not only retain such valuable pigmentary properties as inertness, color, brightness and hiding power, but must also impart desired tint retention to the coating and be free from any tendency to chalk or fade. Various attempts have been heretofore made to produce titanium dioxide pigments useful in both interior and exterior applications, but none has proved successful. Thus, U. S. Patent 1,348,129 proposes to convert titanium dioxide to rutile modification by calcining precipitated titanium dioxide at temperatures of 900 to 1000° C., in the presence of a volatile halogen compound, such as zinc chloride. Similarly, U. S. Patent 1,436,164 proposes to produce pigment titanates in crystal modification containing titanium dioxide and an insoluble salt of a bivalent metal by mixing and subsequently heating equivalent amounts of precipitated titanic acid and a bivalent metal compound. Due to the conversion or other conditions prevailing in these and other prior processes, the pigment product obtained is of either very unsatisfactory color, exhibits objectionable chalking and fading failures when present in exterior coating applications, or does not possess that complete and desired combination of essential pigmentary properties requisite to a titanium dioxide pigment adapted to all manners and types of commercial usage.

I have found that this inherent lack of durability and tendency towards chalking and fading which prior titanium pigments exhibit can be effectively overcome, and it is accordingly an object of my invention to provide such a result. A further object of the invention is to provide a novel and improved type of titanium dioxide pigment and process for producing the same which will inherently possess all of the essential pigmentary attributes referred to, as well as exhibit excellent durability and resistance towards chalking and fading. A further object includes the production of an improved type of titanium dioxide pigment which is of substantially non-porous structure, and characteristically uniform, but relatively large and coarse in particle size. A further object includes the production of an improved titanium dioxide pigment in substantially rutile crystalline modification, of improved and satisfactory color, tinting strength and hiding power, and which possesses other desirable pigmentary properties such as satisfactory oil absorption, brightness, inertness, etc.

These and other objects are accomplished in my invention which broadly comprises producing a titanium dioxide pigment in substantially rutile crystalline modification, by subjecting the titanium dioxide to a plurality of calcinations at elevated temperatures and under controlled conditions of treatment.

More specifically, my invention comprises subjecting anatase titanium dioxide to initial calcination in order to first develop therein desirable pigmentary properties, effecting said calcination in the presence of a colorless, heat-resistant, water-soluble compound of an alkali metal, which functions to inhibit conversion of the anatase to rutile during such initial calcination, and thereafter, but in the substantial absence of said alkali metal compound, recalcining the resultant pigment, whereby conversion to its substantially rutile modification becomes effected.

Having broadly referred to the underlying concepts of my invention, and in order that a more complete understanding of the same will be had, a brief description of the various pigmentary terms which I shall employ to describe the properties of my novel pigments and methods for determining the same will now be undertaken.

Durability

For purposes of the present invention, durability may be described as the resistance which a pigment exhibits towards fading and chalking when tested in paints employed in exterior exposures and automotive finishes.

In determining the durability and non-fading or non-chalking characteristics of the pigments of the present invention, an outside house paint formulation was selected, consisting of a linseed oil vehicle containing 92% acid refined linseed oil and 8% of bodied linseed oil. Pigmentation was at 28.5% pigment volume and the titanium pigment made up 24.4% of the weight of the pigment. A 35% leaded zinc oxide and fibrous magnesium silicate (36.6% of the former and 39% of the latter) made up the remainder of the white pigment portion of the paint. The paints were ground on a three-roll paint mill at optimum paint grinding consistency and later thinned with the remainder of the oil and the proper amount of mineral spirits. Tinting to standard gray and buff tints was made with the proper paste colors and were exposed along with the whites.

Exposure tests of these paints were made on edge grained white pine panels. Three coats of paint were applied to each panel, using a standard recommended reduction for first and second coats (½ pint turpentine plus 1 pint of raw linseed oil for the first coat, and 1 pint of turpentine plus ½ pint of linseed oil for the second coat). The third coat was applied unreduced. These panels were exposed for direct comparison with similar panels containing standard titanium dioxide, extensively employed in the industry, on both vertical and 45° inclined Delaware fences facing south and also on 45° south Florida fences.

Determination of the durability characteristics of the pigments of the present invention in automotive finishes was also made, and in direct comparison with standard $Sb_2O_3$—$TiO_2$ pigments employed in such finishes. The pigments were formulated in an automotive finish of the well known polyhydric alcohol-polybasic acid type, the formulation comprising 23% pigment, 31% of a drying oil modified polyhydric alcohol-polybasic acid resin, and 46% solvent. The enamels were prepared by grinding in pebble mills followed by addition of 0.07% cobalt drier as metal, tinting to the desired shade, and thinning with additional solvent for spray application. The enamels were applied on undercoated steel panels which were exposed to Florida sunshine on a 45° S. fence.

In grading the exposed panels for chalking and fading, an arbitrarily selected numerical scale was adopted, running from 0 to 18,—"0" representing no fading and "18", very extreme fading. A difference of one point on the scale is material.

Absolute reflectance or brightness

Reflectance is the ratio of light reflection from the sample to be tested to light reflected from standard MgO under conditions of equal and essentially diffuse illumination, and as viewed from a direction normal to the surface of the sample. The spectral reflection characteristics of the pigments of the instant invention have been measured by a so-called Hardy Recording Photoelectric Spectrophotometer, a detailed description of which instrument and methods for operating the same are found in "Physical and Chemical Examination of Paints, Varnishes, Lacquers, Colors" by Gardner, 8th edition, January 1937, pp. 135–136; Journal of Optical Society of America, vol. 25, pp. 305–311, September 1935, and vol. 23, p. 359 (1933).

The apparatus is so constructed that the light reflected from the surface of a solid material may be the basis of a curve drawn at the time of the measurement. Mono-chromatic light is used and readings are possible throughout the visible spectrum with light ranging from 400–700 millimicrons. By use of the 1931 C. I. E. Standard and Coordinate System, curve values for dominant wave lengths in millimicrons, % Excitation purity, % Brightness, the Tri-Chromatic Coefficients and Tri-Stimulus Values are calculated.

The samples were prepared for test by pressing the pigments into a pillbox holder against a glass plate to obtain a smooth, homogeneous surface, and the surface of the pressed powders examined directly in the Hardy P. E. Recording Spectrophotometer.

The surface of the pressed powder sample is illuminated normally by monochromatic light and the amount of light reflected diffusely, relative to the amount of the same light reflected in the same manner from a surface of magnesium oxide, is a measure of the percent reflectance of the sample at the wavelength used. The sample is examined at all wavelengths, in turn, throughout the visible spectrum, and the values of reflectance at each wavelength form a continuous curve, referred to as a spectrophotometric curve.

By use of the 1931 C. I. E. Standard Observer and Coordinate System and E. I. E. Illuminant "C", values may be calculated from the spectrophotometric curve that describe the sample in much the same manner as it would appear visually to a normal observer, where illuminated by north sky light. The values of Dominant Wavelength (in millimicrons), % Excitation Purity, and % Brightness have been so calculated from the curves of the samples, and these values correspond approximately to the terms hue (whether red, yellow, green or blue), saturation (how blue, how red, etc.), and brilliance (whether a "dark" or a "light" shade), respectively.

Color

Color is the apparent brightness and tint of the pigment in an oil paste, as measured relative to a standard similarly prepared as is expressed in units on an arbitrary scale.

The procedure followed in testing the pigments of the instant invention is essentially that described by J. E. Booge and H. E. Eastlack in the Paint, Oil and Chemical Review, April 9, 1924. Briefly, this comprises mulling the pigment with acid refined linseed oil of acid number 12.5 to form a thick paste. The sample to be tested and the standard are placed besi₁. each other on a microscopic slide 2" x 3" in daubs about 1½″ x 1″. The daubs should be in sharp contact without air bubbles in the contact line and should be sufficiently thick to cut off all transmitted light. The pastes are then graded under north sky light for difference in appearance. The minimum perceptible difference in brightness is called one point of color. The sample is graded in full points from the standard. Differences in tint are important. In the case of white pigments a yellowish cast of the sample is penalized in the grading to the extent of one or more points, depending on whether it is barely perceptible or clearly evident. On the other hand, a bluish cast relative to the neutral standard is considered desirable and consequently modifies the grading upward.

The scale is selected in an arbitrary manner and values are given to several standard pigments within the useful range, a difference of one point being material. Salable pigments should rate above 8 or higher.

Tinting strength

Tinting strength is a measure of the effectiveness of a white pigment in covering up the tint of a colored pigment mixed with it. The property is relative in nature and results are obtained in comparison with another pigment used as a standard. These results depend on the standard for magnitude, but are independent of the standard for relative order.

The tinting strengths of the pigments produced in accordance with the instant invention were determined substantially in accordance with the method described by J. E. Booge and H. E. Eastlack in the Paint, Oil and Chemical Review, April 18, 1924. Briefly, pastes are prepared by mulling together the white pigment, ultramarine blue, and acid refined linseed oil of 12.5 acid number. The proportions used in determining the tinting strength of pigments of the invention were 3.0 grams of the titanium pigment, 1.0 grams of ultramarine blue and 1.5 cc. of oil. These ingredients were made into a paste with a spatula and mulled for 3 minutes with a 15 pound weighted muller.

Standards are prepared in the same manner except for the amount of blue which is increased or decreased proportionally as it is desired to prepare standards for lower or higher strength. The proportion of blue used in the standard paste to give any desired strength is inversely proportional to that strength. Thus, one standard is called arbitrarily 150 which corresponds to 1.0 gram of blue in the paste. The required amount of 140 strength is $$\frac{150}{140} \times 1.0 \text{ or } 1.0714 \text{ grams}$$

A standard titanium oxide pigment which was arbitrarily graded 150 was used. This pigment was of commercial quality similar to that regularly supplied to the paint industry at the present time.

The samples are graded by placing the sample paste on a microscope slide between standards of higher and lower strength (that is less or more deeply tinted) and not more than 5% apart in strength.

Hiding power

Hiding power may be defined qualitatively as that property of a paint which enables it to obliterate beyond recognition any background over which it is spread. Mathematically, it is usually expressed as square feet per gallon of paint.

The hiding power of a pigment may be calculated from the hiding power of the paint in which it is compounded by a simple calculation involving the figure for the weight of pigment per gallon of paint. It is expressed as the area in square centimeters covered per gram of pigment.

The equipment and methods used in determining hiding power values were substantially those described in Gardner's "Physical and Chemical Examination of Paints, Varnishes, Lacquers, Colors" (January 1937 edition) page 45, et seq., entitled "Krebs dry film incomplete hiding power."

Oil absorption

Oil absorption is the amount of oil in grams required to wet 100 grams of pigment.

The method of testing employed in determining oil absorption values is described in Gardner's Physical and Chemical Examination of Paints, Varnishes, Lacquers and Colors, 1933 edition, pp. 475–7.

A 5-gram sample is used, acid-refined linseed oil of 12.5 acid number is added slowly from a burette and worked into the pigment with a spatula on a smooth glass plate. The addition of oil is continued, a drop or two at a time, until the pigment can be collected on one coherent mass adhering to the spatula, but not wetting the glass. The amount of oil used to wet the pigment is read from the burette.

Particle size

Particle size, as employed herein, refers to the magnitude of the discrete particles making up the pigment. It is expressed usually as the arithmetical mean average diameter of the pigment particles.

The method employed for determining the same is outlined in the Proceedings of the Thirty-Sixth Annual Meeting of the American Society for Testing Materials, vol. 33, pp. 989–995 (1933). This comprises a photomicrographic method and reproducibility within satisfactory limits was found possible. Briefly, the pigments are dispersed in Canada balsam in the preparation of the slides. Photomicrographs are made at 1500X magnification, using a 90X apochromat objective and a 12.5X Huygenian ocular. A carbon arc with a Wratten #49 filter is employed as a source of light. Photographic prints are made with enlargement of 3⅓ times, giving an overall magnification of 5000 diameters.

For each pigment, at least 250 particles were measured in each of three representative fields. The horizontal diameters splitting the particles in half were measured in each case. The average diameters $d_1$ (arithmetical mean average) were then calculated using the relationships $$d_1 = \frac{\epsilon n d}{\epsilon n}$$

$\epsilon n$ representing the number of particles of any given mass.

Crystal structure

As indicated, titanium dioxide occurs in three different crystalline forms, anatase, brookite, and rutile. Each crystal form has its characteristic X-ray diffraction pattern and present day technique is sufficiently developed to give semiquantitative percentage values for mixtures of the modifications.

In determining the crystal structure of the pigments of the instant invention, the finely-divided pigment is placed in the path of a beam of X-rays and a diffraction pattern is obtained on a negative in the customary manner. The developed negatives are then compared to known standard patterns. Two or more patterns may be present on one negative and each can be identified in this comparison. By using the proper time of exposure, the contrast of the lines in the two patterns give a measure of the concentration of each component in the mixture. This estimation is made more accurate by preparing negatives of pigment mixtures of known concentrations of anatase, rutile, etc. and using these in the comparisons.

Having explained in some detail the terminology employed to describe the various pigmentary properties which the novel pigments of the present invention will characteristically exhibit, a description of one practical adaptation of said invention will now be undertaken.

In one preferred adaptation, raw, precipitated anatase titanium dioxide, in either moist or dry condition, and about .5% of potassium sulphate are intimately mixed and the resultant mixture calcined at a temperature between 950–1000° C. in a rotary kiln type of calciner for a period of time sufficient to develop such pigmentary properties as maximum strength, hiding power, color and oil absorption in the titanium dioxide. The alkali salt acts as a negative catalyst during calcination to inhibit conversion of the anatase to rutile titanium dioxide. Upon completion of calcination, the pigment-developed anatase is wet ground in a closed circuit system, such as is described in U. S. Hanahan Patent 1,937,037, ammonia being employed as a dispersing agent in such wet grinding operation, in order to avoid addition of salts which will not volatilize during subsequent recalcination. During such wet grinding processing, the alkali salt present in the pigment becomes solubilized and is substantially completely eliminated from the pigment during subsequent dewatering and filtering operations and prior to subsequent recalcination of the pigment. The dewatered pigment recovered is then dried and subjected to recalcination at a temperature in excess of 950° C., and preferably of the order of about 975° to 1050° C., whereby conversion of the anatase to substantially rutile modification titanium dioxide is effected. The drying and recalcining operations are preferably conducted as a single step and in a continuous type of rotary kiln. The recalcined rutile-converted pigment is then cooled and ground to pigment fineness in conventional wet or dry grinding media, after which it is ready for direct use in coating compositions adapted for either interior or exterior applications, or for incorporation in paper, textiles, rubber, etc.

More specific illustrative embodiments of my invention comprise the following examples, none of which are to be considered as in limitation of the underlying concepts of the invention:

*Example I*

Hydrated titanium oxide was calcined in the presence of .5% $K_2SO_4$ frit at a temperature of 985° C. in order to form anatase titanium dioxide and to develop thereby the optimum pigment properties such as color, tinting strength, and oil adsorption. The product of calcination was then dispersed in water with 0.18% NaOH and ground in a pebble mill to produce a pigment of excellent texture. The ground, dispersed aqueous slurry of pigment was coagulated with 0.5%

$$MgSO_4.7H_2O$$

neutralized with $H_2SO_4$ to a pH of 7 and filtered, dried and pulverized. The finished, finely divided pigment was then subjected to a second calcination by heating at a temperature of 1000° C., for several hours, thereby transforming all of the pigment into the rutile form and increasing the crystallinity and size of the pigment particles. The product of this second calcination was in finely-divided form and after being ground by wet or dry methods was adapted for direct use in paints, enamels, lacquers, etc.

*Example II*

Hydrated titanium oxide is calcined in the presence of .5% $K_2SO_4$ frit at a temperature of 975° C. The product of this calcination was then pulverized and leached with water so that the soluble salts content is substantially below 0.1%. The washed pigment was then subjected to a second calcination, as described in Example I, to form a titanium dioxide pigment existing entirely in the rutile crystalline form. The product of the second calcination was then wet ground to suitable texture, then dry ground, and was likewise ready for direct usage.

*Example III*

Hydrated titanium oxide obtained by the hydrolysis of a titanium sulfate solution and thorough washing of precipitate is treated with 0.75% potassium carbonate and subsequently calcined in a gas fired rotary kiln at a maximum temperature of 950° C. The product was dispersed in water, wet ground, and elutriated. The resultant dispersion was coagulated with sulfuric acid and filtered. The filter cake was dried and recalcined in a gas fired rotary kiln at a maximum temperature of 1025° C. The product was then dry ground or wet ground, with or without elutriation, to obtain a product suitable in the manufacture of paints and enamels.

Pigments produced in accordance with my invention will exhibit desirable and exceptionally high durability characteristics, especially when employed in exterior house paints and automotive finishes where they will be particularly resistant towards fading and chalking. It is in these fields that prior white titanium oxides have shown their inability to displace other prime pigments, in spite of their superior hiding power. Excessive chalking of white automotive paints or finishes made with prior titanium dioxide has prevented its adoption in this field, and excessive fading of tints has prevented its widespread adoption in exterior tinted paints.

From a series of exposure tests to determine comparative durability, wherein panels coated with a widely-used outside house paint formulation, such as that referred to, and with an automotive finish formulation consisting of a polyhydric alcohol-polybasic acid resin, were used, it was found that the pigments of the instant invention exhibited excellent fade and chalking resistance characteristics, even after prolonged exposure to the elements. In each instance, suitable control panels were employed, consisting of prior titanium dioxide pigments in the standard paint and automotive finish formulations. The panels employed were exposed on vertical and 45° inclined Delaware fences facing south, and also on 45° south Florida fences, as described. The Florida exposure is a greatly accelerated test by which one may determine the paint properties of a given pigment within a shortened period of time.

After approximately five months' exposure on outside house paints, the following fading and chalking results were obtained (the Florida exposures being naturally more advanced):

| Pigment | Gradings | | | |
|---|---|---|---|---|
| | Florida 45° S | | Delaware SV | |
| | Gray | Buff | Gray | Buff |
| Prior art TiO$_2$ (anatase) | 14 | 16 | 14 | 13 |
| Prior art TiO$_2$ (rutile) | 14 | 15 | 14 | 14 |
| Recalcined converted rutile TiO$_2$ | 6 | 0 | 3 | 0 |

After three and one-half months' Florida exposures, in automotive finishes of the type referred to, the following results were obtained:

*Pigment*

|  | Chalking and fading |
|---|---|
| Prior art TiO$_2$ (anatase) | 18 |
| Prior art TiO$_2$ (rutile) | 18 |
| Rutile converted, recalcined TiO$_2$ | 0 |

The foregoing chalking and fading results effectively demonstrate the superiority of the instant pigments over prior titanium pigments. Thus, exterior paints and automotive finishes containing ordinary anatase or precipitated rutile titanium dioxide in admixture with other pigments or extenders, exhibit poor durability, i. e., pronounced and extreme fading and chalking within a very short period of time, whereas my rutile converted titanium dioxide pigments manifest comparatively no fading or chalking, even upon prolonged exposures and in excess of three to five months' time.

In addition to their exceptional durability characteristics, the pigments of my invention will be found to possess many other desirable as well as new and distinctive properties. The titanium dioxide will be in the form of the highest refractive index, i. e., consist substantially of rutile. In contrast to the porous and irregular surface characteristics and small particle size which prior titanium dioxide pigments present, my pigments will be considerably altered in surface characteristics, non-porous, and of relatively smooth and compact crystalline state. Although relatively coarse, they will be substantially regular and uniform in crystallinity and their particle size, as stated, will be larger than prior titanium dioxide, but within an average ($d_1$) particle size diameter range of from about .35 to 1.8 microns. The major proportion of the pigment will be within the desired range of about .40 to about .80 micron diameter, this latter being well within the range most desired and useful for pigments to be employed in exterior paints and automotive finishes where durability is an essential requisite. When these sizes are compared with prior titanium dioxide pigments which exhibit undesirable chalking and fading properties, their distinction thereover in this particular alone will be clearly evident. Thus, by corresponding methods of particle size determination, prior anatase pigments have an average ($d_1$) particle size diameter of about .29 micron, and more than 70% of their particles are less than about .3 micron, while 90% thereof will not exceed .4 micron and none range to as high as .8 micron. Likewise, prior rutile TiO$_2$ pigments possess an average particle size of about .26 micron and usually within the range of from about .20 to .30 micron.

My novel pigments are also superior in hiding power and tinting strength values over prior titanium dioxide pigments, rendering them exceptionally desirable for all types of commercial usage. For instance, when obtained in accordance with my preferred operating conditions, the instant pigments will exhibit tinting strength values ranging from about 140 to about 170, and considering that the lowest acceptable limit for a commercial and exceedingly high grade pigment is 120, this effectively demonstrates the manifest superiority of my pigment over those previously obtainable, in this respect alone. The increase in hiding power and tinting strength which my novel pigments afford is very advantageous because one is thereby permitted to formulate the paint with satisfactory one-coat hiding power, or, alternatively, to incorporate the pigment in paints with more inert extenders of low cost, thus reducing the cost of such paint, without incurring any sacrifice in hiding power or durability.

Furthermore, my novel pigments will possess other valuable pigmentary characteristics, particularly in respect to satisfactory oil absorption and color or brightness. Thus, their oil absorption values may range from about 16 to about 20, these values decreasing as calcination temperatures increase. For commercial purposes an oil absorption value of 12 or less is not acceptable, while a value of 15 or higher is considered very desirable.

Although specific temperatures of calcination and recalcination have been specified as useful herein, I preferably resort to a range of calcination temperature of from about 800° C. to 1100° C., employing a somewhat lower temperature during initial calcination treatment. In such initial calcination, I also preferably employ temperatures in excess of 900° C. but below 1000° C., employing higher temperatures (but not to exceed substantially 1100° C.) during recalcination, during which conversion to rutile is effected. However, it will be obvious calcination temperatures of the same order may be employed, if desired, during each heating step and that suitable variance between any temperatures so utilized may be resorted to. Optimum temperatures to be selected will depend upon the pigment properties to be developed and extent of conversion desired, as well as upon the particular color value to be imparted to the pigment. In general, calcination temperatures influence the color or brightness of the pigment and the color values obtained will usually check the brightness values, as measured by the Hardy Spectrophotometer, indicating that as temperatures of calcination increase, pigment color values decrease. Accordingly, in some instances it may be desirable to employ relatively low ranges of calcination temperatures in order to minimize or avoid color losses. While use of relatively high calcination temperatures effects a lowering in color and may therefore be considered as generally undesirable, it will be found that starting with a pigment having a brightness or color of about 95% or higher in my invention, a color value of 90% or higher may be easily obtained. Thus, a satisfactorily white or bright pigment can be obtained in my invention and any color loss arising can easily be tolerated since it is more than offset by the improved fading and chalking resistance values which my pigments exhibit in exterior paints and automotive finishes over prior titanium pigments. For optimum benefits hereunder, I have found it preferable and desirable to employ such calcination temperatures as will induce from 90 to 100% rutile conversions, i. e., preferably in excess of 95% conversion. For the purpose, it will be found desirable to employ calcination temperatures which are not in excess of substantially 25 to 50° above the point at which complete rutile conversion is effected.

While specific alkali metal salts and amounts thereof have been hereinabove set forth as useful in the invention, in order to inhibit conversion of the anatase to rutile during the initial calcination step, it will be understood that such salts and amounts are not critical in the invention. Thus, I generally contemplate using those water-soluble, colorless and heat-resistant alkali metal compounds or salts having residues which may be easily removed prior to recalcination and during the usual washing and filtration operations normally employed in pigment production. All water-soluble alkali salts, and particularly those of potassium will be found especially beneficial in the invention. Thus, I prefer to employ potassium sulfate as an inhibitor against rutile conversion during the initial calcination, although such other alkali metal salts as sodium sulfate, potassium or sodium carbonate, the alkali halides, sodium sulfide, etc., are also contemplated as useful. Generally, relatively small amounts of soluble alkali salts, such as potassium sulfate, may be employed, i. e., ranging from about .3% to 1% and up to as high as, say, 2%. Upon conclusion of the initial calcination, the pigment-developed anatase $TiO_2$ may be suitably water-washed or filtered to completely remove any soluble alkali salt present, or decrease its content to below substantially .1%, in order that the pigment may be recalcined and converted to rutile, in the absence of any substantial amounts of such salt.

As indicated, the use of an alkali metal salt during the initial calcination inhibits conversion of the anatase $TiO_2$ pigment to rutile, and affords a process whereby optimum particle size and maximum pigment properties are had prior to conversion of the anatase pigment to rutile. This is a distinct advantage and feature of the invention.

During the initial calcination, some sintering occurs, and, as a result, agglomerates form. These are broken down by grinding prior to the subsequent recalcination and development of the rutile crystal. This grinding is preferably had by resorting to wet grinding methods, since it yields particles which are finer and freer of compacted agglomerates caused by the pressure present in pulverizing grinding means. The resultant particles are more discrete and there is a tendency for the formation of difficultly divided agglomerates in the subsequent calcination.

Furthermore, grinding the initially calcined pigment in water suspension permits the alkali metal salt present in the first calcination to become dissolved and removed prior to recalcination. Therefore, the use of a hydroseparation circuit of the type above mentioned in the grinding system is very desirable, since the larger sintered particles become thereby more effectively reduced and the alkali metal salt is thereby more easily dissolved out. Ammonia or sodium hydroxide may be employed as the dispersing agent during wet grinding.

During a dewatering operation employing an ammonia dispersed hydroseparator overflow, the pH of the mixture is preferably adjusted to a point near neutrality by addition of a suitable mineral acid, such as sulfuric or hydrochloric acid. Coagulation is effected, preferably by the addition of a small amount of a flocculating agent, such as a solution of magnesium sulfate. The concentration of pigment in this slurry is usually about 100 g./l., and by thickening and filtering, this ratio of about 10 pounds of water per pound of titanium dioxide becomes decreased to about 1 pound of water per pound of titanium dioxide. The soluble salts employed in the initial calcination, as well as the magnesium sulfate, are thereby eliminated to in excess of substantially 90% by such treatment. Further removal prior to subsequent calcination can be conveniently effected by more extensive washing or displacement of the dilute salt solution in which the pigment is held with fresh water. Should large amounts of salts be employed in the previous operations, this more extensive washing is to be recommended as the product going to the second calcination should not contain more than, say, about .1% of alkali metal salts, calculated as the sulfate.

It will be understood that the titanium dioxide adapted for treatment in the present invention comprises preferably the precipitated variety, obtained, for instance, from the employment of the processes disclosed in U. S. Reissue Patents 18,854 and 18,790, or U. S. Patent 2,062,133. Also, and as indicated, the titanium dioxide pigments of my invention will be adapted for many uses, and especially in paint and coating composition formulations to be employed in exterior exposures. Specific types thereof include the well known oil types of paints, enamels containing a resin, coating compositions containing an alkyd resin, or various types of lacquers such as nitrocellulose lacquers adapted for use in automotive finish formulations. Similarly, the pigment will be found useful for delustering rayon, whereby fade-resistant dyed fabrics can be produced therefrom. Their use therein is not limited to any particular type of rayon, but may be used in all types, not only in the viscose variety, but also in acetate fibers and fabrics. Furthermore, it will be understood that the term "titanium dioxide" here and in the appended claims is used in its broadest sense and intended to comprise not only titanium dioxide per se but titanium dioxide modified by either precipitated, blended or coalesced alkaline earth metal sulfate extenders, such as those of barium or calcium, or with other types of extenders, such as silica, magnesium silicate, or silicates in general.

I claim as my invention:

1. A process for producing rutile titanium dioxide comprising subjecting anatase titanium dioxide to initial calcination at temperatures ranging from about 800 to 1100° C., in the presence of a small amount of potassium sulfate, treating the resultant calcined pigment to effect substantially complete removal of potassium sulfate therefrom, and thereupon recalcining said pigment to convert the same to substantial rutile modification.

2. A process for producing titanium dioxide in substantially the rutile crystalline modification, comprising initially subjecting anatase titanium dioxide precipitated from the hydrolysis of a titanium sulfate solution and while admixed with from about .3 to 2% of potassium sulfate to calcination at temperatures ranging from substantially 800–1100° C., said calcination being conducted for a period of time sufficient to develop the pigment properties of said titanium dioxide while maintaining the anatase crystalline forms thereof, thereafter washing the resulting anatase titanium dioxide pigment to effect the substantially complete removal of said potassium sulfate therefrom, and then recalcining the resulting anatase, substantially purified pigment within the aforesaid temperature range to effect its substantially complete conversion to rutile.

3. A process for producing titanium dioxide in substantially the rutile crystalline modification, comprising initially subjecting anatase titanium dioxide precipitated from the hydrolysis of a titanium salt solution, while admixed with from about .3 to 2% of potassium sulfate to calcination at a temperature ranging from substantially 950° C. to 1000° C., and for a period of time sufficient to develop its pigment properties while maintaining the anatase crystalline form of said titanium oxide, dispersing, wet grinding, elutriating and dewatering the resulting anatase titanium dioxide pigment, and then recalcining the resulting dewatered product at a temperature ranging from about 975–1050° C., while substantially free from said potassium sulfate, to effect the substantially complete conversion of the anatase titanium dioxide to rutile.

4. A process for producing a titanium dioxide pigment in substantially the rutile modification, comprising subjecting anatase titanium dioxide to calcination in the presence of a soluble alkali metal compound under such conditions and for a period of time sufficient to develop the pigment properties thereof while maintaining the anatase crystalline form of said titanium dioxide, treating the resulting product to substantially completely remove said alkali metal compound therefrom, and then subjecting said pigment to recalcination to convert the same to substantially rutile.

5. A process for producing a titanium dioxide pigment in the rutile modification, comprising subjecting anatase titanium dioxide precipitated from a titanium salt solution to calcination in the presence of a small amount of a water-soluble, colorless, heat-resistant alkali metal compound under such conditions and for a period of time sufficient to develop the pigment properties thereof while maintaining the anatase crystalline form of said titanium dioxide, treating the resulting product to effect substantially complete removal therefrom of said alkali metal compound, and then subjecting said treated product to recalcination to convert the same to substantially rutile.

6. A process for producing a titanium dioxide pigment in substantially the rutile modification comprising subjecting anatase titanium dioxide obtained from the hydrolysis of a titanium sulfate solution to calcination in the presence of a minor amount of a white, water-soluble, alkali metal salt under such conditions and for a period of time sufficient to develop the pigment properties of said titanium dioxide while maintaining the anatase crystalline form thereof, thence treating the resulting product to substantially completely remove any alkali metal salt residue remaining therein, and then subjecting the treated pigment to recalcination to convert the same to substantially the rutile crystalline form.

7. A process for producing rutile titanium dioxide comprising subjecting the purified anatase titanium dioxide precipitate obtained from the hydrolysis of a titanium sulfate solution to initial calcination at temperatures ranging from about 800 to about 1100° C. in the presence of a small amount of a soluble alkali metal compound, under such conditions and for a period of time sufficient to develop the pigment properties of said titanium dioxide while maintaining the anatase crystalline form thereof, treating the resulting product to effect the substantially complete removal therefrom of said alkali metal compound, and then recalcining the resulting pigment to substantially convert the same to its rutile modification.

8. A process for producing a rutile titanium dioxide pigment comprising calcining anatase titanium dioxide in the presence of a small amount of potassium sulfate under such conditions and for a period of time sufficient to develop the pigment properties of said titanium dioxide while maintaining the anatase crystalline form thereof, treating the resulting product to substantially completely remove said potassium sulfate therefrom, and then recalcining the treated pigment to convert the same to substantially rutile.

9. A process for producing titanium dioxide in the rutile modification, comprising subjecting anatase titanium dioxide to calcination in the presence of from about .3% to about 2% of a colorless, heat-resistant, water-soluble compound of an alkali metal under such conditions and for a period of time sufficient to develop the pigment properties of said titanium dioxide while maintaining the anatase crystalline form thereof, treating the resulting product to substantially completely remove said alkali metal compound therefrom, and thereafter recalcining said titanium dioxide to convert the same to substantially rutile.

10. A process for producing a titanium dioxide pigment in the rutile modification comprising subjecting anatase titanium dioxide to calcination in the presence of from about .3% to about 1% of potassium sulfate under such conditions and for a period of time sufficient to develop the pigment properties thereof while maintaining the anatase crystalline form of said titanium dioxide, treating the resulting product to substantially completely remove said potassium sulfate therefrom, and thereafter recalcining said titanium dioxide to convert the same to substantially rutile.

11. A process for producing a rutile titanium dioxide pigment comprising subjecting anatase titanium dioxide to calcination at a temperature ranging from about 900–1000° C. in the presence of a small amount of a colorless, heat-resistant, water-soluble compound of an alkali metal under such conditions and for a period of time sufficient to develop the pigment properties thereof while maintaining the anatase crystalline form of said titanium dioxide, treating the resulting product to effect the substantially complete removal of said alkali metal compound therefrom, and thereafter recalcining the alkali-freed titanium dioxide at a temperature not exceeding substantially 1100° C. to effect conversion thereof to substantially rutile.

12. A process for producing a rutile titanium dioxide pigment comprising subjecting anatase titanium dioxide to calcination at temperatures ranging from substantially 900 to 1000° C. in the presence of from about .3% to 2% of potassium sulfate under such conditions and for a period of time sufficient to develop the pigment properties thereof while maintaining the anatase crystalline form of said titanium dioxide, treating the resulting product to substantially completely remove said potassium sulfate therefrom, and thereafter recalcining said titanium dioxide at a temperature not exceeding substantially 1100° C. and to effect its substantially complete conversion to rutile.

13. A process for producing a titanium dioxide pigment in substantially the rutile crystalline modification, comprising initially subjecting anatase titanium dioxide obtained from the hydrolysis of a titanium salt solution to calcination at temperatures ranging from substantially 800–1100° C. in the presence of a small amount of a water-soluble, colorless, heat-resistant alkali metal compound and under such conditions and for a period of time sufficient to develop the pigment properties thereof while maintaining the anatase crystalline form of said titanium dioxide, treating the resulting anatase pigment to effect substantially complete removal of said alkali metal compound therefrom, and thereafter recalcining the resulting product within substantially the aforesaid temperature range to effect substantially complete conversion of said anatase to rutile.

JAMES ELIOT BOOGE.